US 6,687,421 B1

(12) United States Patent  
Navon (10) Patent No.: US 6,687,421 B1
(45) Date of Patent: Feb. 3, 2004

(54) SKEW DETECTION OF TEXT IN A NOISY DIGITIZED IMAGE

(75) Inventor: Yaakov Navon, Ein Vered (IL)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/528,483

(22) Filed: Mar. 17, 2000

(51) Int. Cl.[7] .................................................. G06K 9/36
(52) U.S. Cl. ....................................... 382/289; 382/290
(58) Field of Search ................................. 382/289, 290, 382/176, 296, 281, 277, 257, 258

(56) References Cited

U.S. PATENT DOCUMENTS

| 4,926,490 A | * | 5/1990 | Mano ............................. 382/9 |
| 5,337,370 A | * | 8/1994 | Gilles et al. ................... 382/14 |
| 5,506,918 A | * | 4/1996 | Ishitani ......................... 382/289 |
| 5,854,853 A | * | 12/1998 | Wang ........................... 382/176 |
| 6,108,444 A | * | 8/2000 | Syeda-Mahmood ......... 382/186 |
| 6,115,497 A | * | 9/2000 | Vaezi et al. .................. 382/174 |

OTHER PUBLICATIONS

Gatos, B. et al, "Skew Detection and Text Line Position Determination in Digitized Documents", *Pattern Recognition*, vol. 30, pp. 1505–1519, 1997, Great Britian.

Messelodi, S. et al, "Automatic Identification and Skew Estimation of Text Lines in Real Scene Images", *Pattern Recognition*, vol. 32, pp. 791–810, 1999, Italy.

* cited by examiner

Primary Examiner—Yon J. Couso
(74) Attorney, Agent, or Firm—Darby & Darby (57) ABSTRACT

A method for deskewing text is disclosed, in which a noisy digitized gray scale image is preprocessed by binarization, noise removal, and then by smearing in three patterns. A selected smeared image having minimal runs is sampled, and the resulting sampled image subjected to the Hough process using a search technique at two angular resolutions. A dominant text line is chosen from the output of the Hough process, and the image deskewed accordingly. The method is suitable for detecting skew at any angle, and is capable of detecting multiple skew text lines.

27 Claims, 8 Drawing Sheets

PENTEL PAPETERIEWAREN AG
PENTEL ARTICLES DE PAPETERIE SA

TEL. (01) 984 28 88
TELEFAX (01) 984 19 21

8132 Egg b. Zürich

50

SKEW DETECTION OF TEXT IN A NOISY DIGITIZED IMAGE

BACKGROUND OF THE INVENTION

1. Field of the Invention

This invention relates to textual image processing applications, for example document analysis and image understanding systems. More particularly this invention relates to a method of skew detection of textual information which is embedded in noisy digitized gray scale images which also contain non-textual information.

2. Description of the Related Art

De-skewing text in digitized images is a critical preprocessing step in document analysis systems and in image understanding systems. Image acquisition devices such as scanners can convert paper documents into image formats suitable for computers. The transformation of images to text is typically accomplished by text processing units which perform operations of binarization, de-skew, layout analysis, and optical character recognition ("OCR"). For optimal performance the input image should be free of skew distortion. Unfortunately, documents are skewed during the scanning process.

In automatic parcel sorting systems, the address is read and decoded while it travels on a conveyor. The addresses on the parcels are located at different locations and positions. In contrast to documents, which often are predominantly textual, and may have redundant data, addresses on parcels contain relatively few characters and few lines. Moreover, addresses are often located in the vicinity of graphics, binding tape, reflecting plastic and other noisy items. Thus, the skew angle detection in the address text becomes very complicated.

It is proposed in the document Automatic Identification and Skew Estimation of Text Lines in Real Scene Images, Messelodi, S. and Modena, C. M., Pattern Recognition 32, pp 791–810 (1999), to automatically localize text embedded in complex images. Following preprocessing, various heuristics are employed to characterize text objects which depend on the geometrical and spatial relations among more elementary components. Text line detection is accomplished by recursive nodal expansion of geometrically related components in the image to develop a tree structure.

Another approach to skew detection is disclosed in the document Skew Detection and Text Line Position Determination in Digitized Documents, Gatos B. et al., Pattern Recognition 30, No. 9, pp 1505–1519 (1997), which attempts to exploit cross correlation between the pixels of vertical lines in a digitized document. A composite correlation matrix is developed for one or more vertical lines, and the skew angle of the document is evaluated from the global maximum of a projection derived from the matrix.

There are disadvantages to the known techniques, particularly when applied to applications where there is limited a priori knowledge of the textual material being captured or evaluated, and where the evaluation is complicated by noise and various non-textual elements.

SUMMARY OF THE INVENTION

It is therefore a primary object of the present invention to provide an improved method of deskewing text in composite digitized gray scale images.

It is another object of some aspects of the invention to provide a technique for skew detection to improve the accuracy and efficiency of applications where the skew angle is unconstrained, such as automatic parcel and mail sorting.

These and other objects of the present invention are attained by a method for text skew detection operative in gray scale images, including noisy gray scale images, and at any skew angle, which is performed by smearing a binary digitized image in at least one direction, and determining a skew angle of a dominant text line in the smeared digitized image. Optionally the digitized image is preprocessed by binarization, and by the removal of nontextual components According to one aspect of the invention selection of a dominant text line is performed by the Hough method, preferably conducted at first and second angular resolutions.

According to another aspect of the invention the image is sampled by selecting start points and end points of runs therein, and the dominant text line is selected from the sampled image.

According to yet another aspect of the invention smearing of the digitized image is performed by smearing the binary digitized image in one of a horizontal direction and a vertical direction to yield a first smeared image, smearing the digitized image in the other of the horizontal direction and the vertical direction to yield a second smeared image, and smearing the digitized image in both the horizontal direction and the vertical direction to yield a third smeared image. One of the first, second and third smeared images is selected according to a minimum number of runs therein. Preferably the selection of the dominant text line is performed on a sampled image, wherein start points and end points of runs in the selected smeared image are sampled.

The invention provides a computer-readable medium in which computer program instructions are stored, which instructions, when read by a computer, cause the computer to accept as input a digitized image having textual material embedded therein, and to determine at least one skew angle of the textual material by executing a process of binarization, and smearing the binary digitized image in at least one direction, selecting a dominant text line from the smeared image, and determining the skew angle of the dominant text line.

In one aspect of the invention the computer program instructions further cause the computer to binarize the digitized image prior to executing the process of smearing.

In another aspect of the invention the computer program instructions cause the computer to remove nontextual components from the digitized image prior to executing the process of smearing.

In yet another aspect of the invention the computer program instructions cause the computer to select a dominant text line by executing an algorithm according to the Hough method. Preferably the Hough method is executed at first and second angular resolutions According to still another aspect of the invention the computer program instructions cause the computer to sample start points and end points of runs in the smeared image to yield a sampled image, and to select the dominant text line from the sampling.

Most preferably the computer program instructions further cause the computer to execute the step of smearing by smearing the binary digitized image in one of a horizontal direction and a vertical direction to yield a first smeared image, smearing the binary digitized image in another of the horizontal direction and the vertical direction to yield a second smeared image, and smearing the binary digitized image in both of the horizontal direction and the vertical direction to yield a third smeared image. The computer is caused to select one of the first, second and third smeared images according to a minimum number of runs therein.

The invention provides an automated classification system, which has a conveyance for transporting items to be classified, wherein the items have classification information written thereon. An acquisition device has a field of view directed toward the conveyance for acquiring an image of the classification information. A digitizing unit converts the acquired image to a digitized image. A computer is provided with a program of instructions which causes the computer to accept as input the digitized image, and to determine at least one skew angle of the classification information by the steps of binarization of the image, smearing the binary digitized image in at least one direction, selecting a dominant text line from the smeared digitized image, and determining a skew angle of the dominant text line. An analysis program of the computer accepts the digitized image and the skew angle and evaluates the classification information based on the deskewed image. Control signals are then output from the computer responsive to the analysis program, to control a classifier for classifying the transported items.

According to another aspect of the invention the instructions further cause the computer to select the dominant text line by the Hough method. This is preferably accomplished using a first, coarse angular resolution and then a second, fine angular resolution.

In a further aspect of the invention the instructions further cause the computer to sample start points and end points of runs in the smeared image to yield a sampled image, and selection of a dominant text line is performed on the sampled image. Preferably the digitized image is smeared in one of a horizontal direction and a vertical direction to yield a first smeared image, then smeared in the other of the horizontal direction and the vertical direction to yield a second smeared image, and finally smeared in both the horizontal direction and the vertical direction to yield a third smeared image. One of the first, second and third smeared images is selected according to a minimum number of runs therein.

BRIEF DESCRIPTION OF THE DRAWINGS

For a better understanding of these and other objects of the present invention, reference is made to the detailed description of the invention, by way of example, which is to be read in conjunction with the following drawings, wherein.

DESCRIPTION OF THE PREFERRED EMBODIMENT

In the following description, numerous specific details are set forth in order to provide a through understanding of the present invention. It will be apparent however, to one skilled in the art that the present invention may be practiced without these specific details. In other instances well known circuits, control logic, and the details of computer program instructions for conventional algorithms and processes have not been shown in detail in order not to unnecessarily obscure the present invention.

The terms "text" and "textual material" as used herein are not restricted to literal text, but also include any written information having a spatial orientation, for example bar coded information and similar encoded information.

Figure 1:
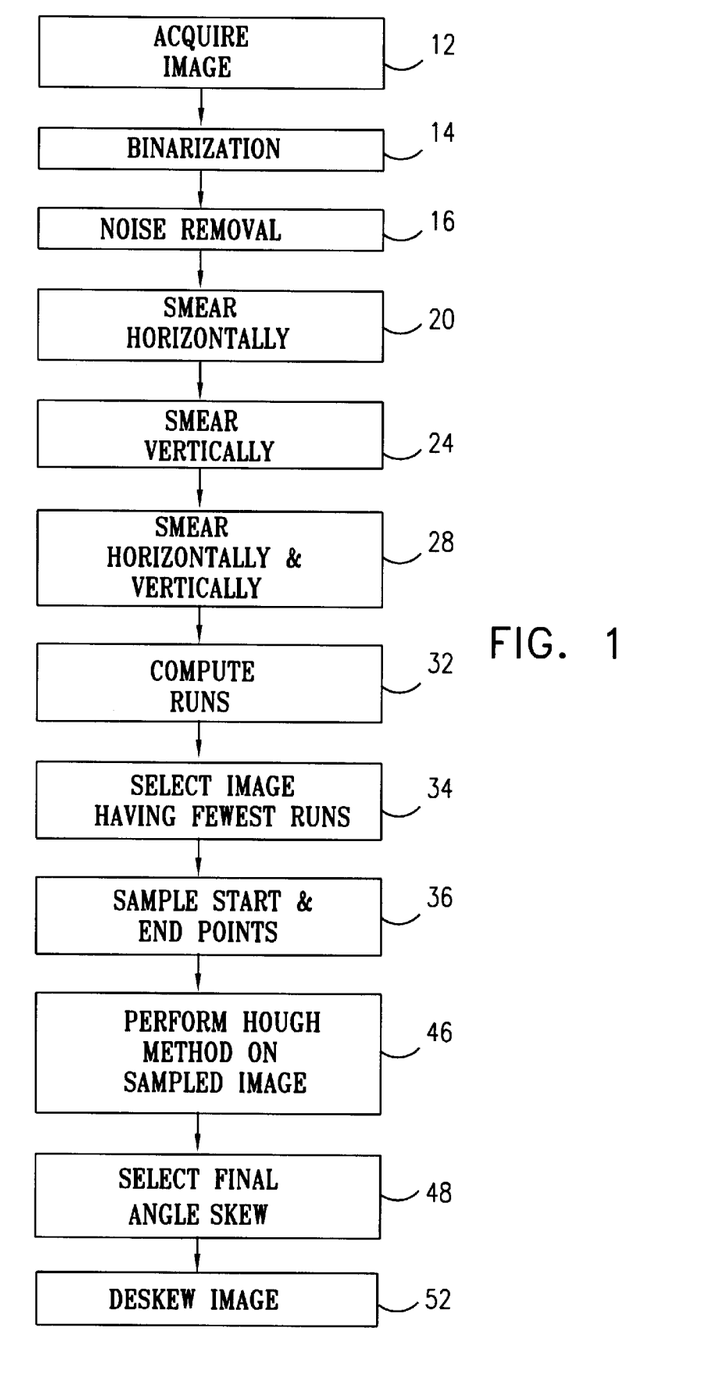
FIG. 1 is a flow chart illustrating the steps of the method in accordance with a preferred embodiment of the present invention.

Referring now to FIG. 1 a gray scale image (not shown) generally forms the input to the inventive method. The input image is acquired at step 12 by a scanner, digital camera, or other known means. This image is typically a complex scene, and no a priori knowledge of embedded textual content is assumed. During preprocessing of the grey scale image, binarization is first carried out at step 14. Binarization is preferably accomplished by the technique disclosed in copending application Ser. No. 09/310,287, of common assignee herewith, which is hereby incorporated by reference. The resultant binary image includes only text and graphics of a stroke width (pen width) within a range of values which was estimated from the gray scale image during the binarization process.

Figure 2:
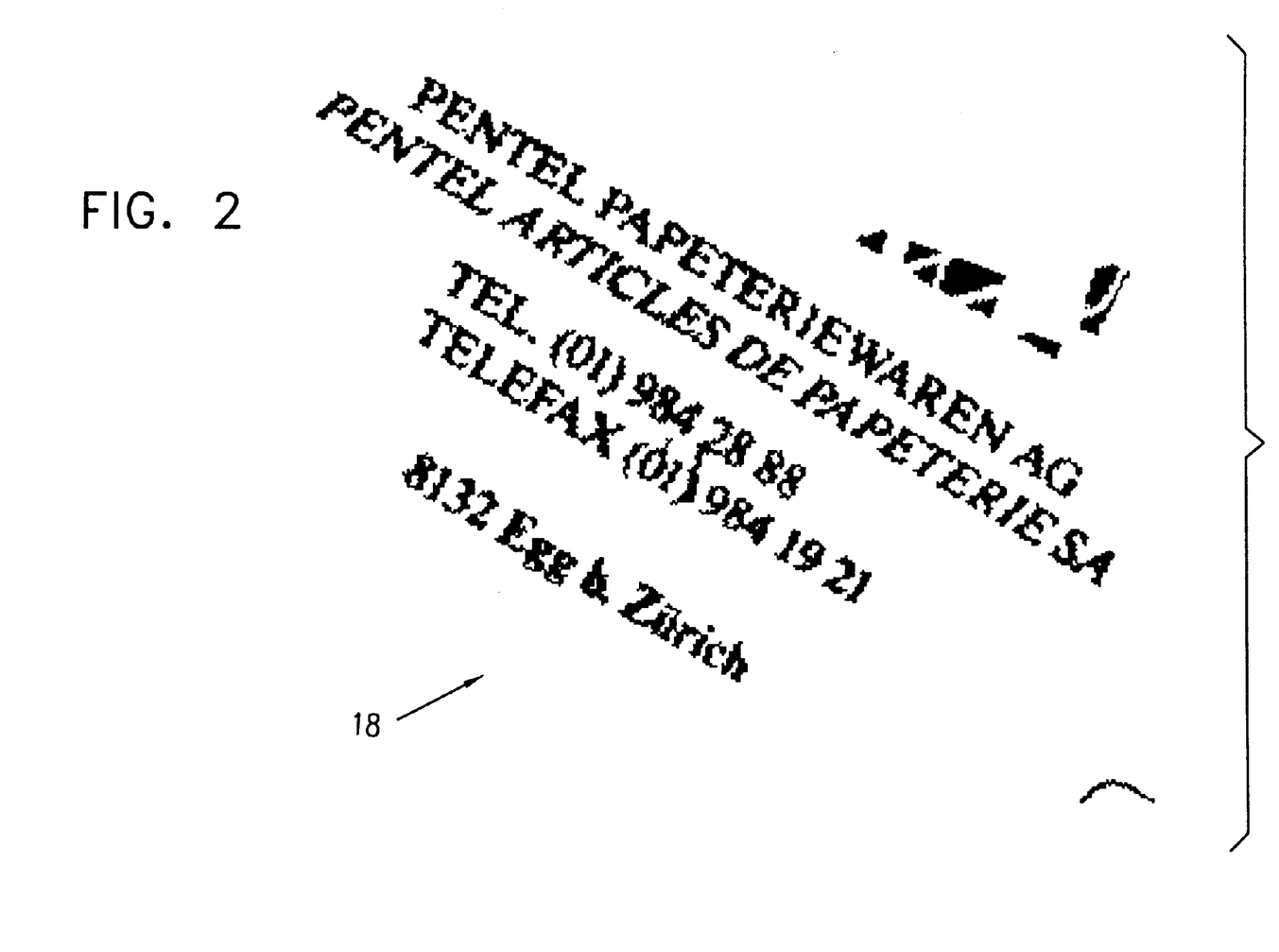
FIG. 2 shows a scene which is the input to the method in accordance with the invention following binarization and noise removal.

At step 16 nontextual elements such as long lines, graphics, frames and other noisy items are removed, because such noise biases the skew search process. The term "noise" as used herein includes the above mentioned non-textual elements, and also includes other spurious variations in gray scale level which are represented as random dots or stains in the binarized images. By using well known connected component techniques, or equivalent methods, components larger and smaller than a predetermined size range are removed. The resulting image 18 is shown in FIG. 2, and consists principally of textual information.

Figure 3:
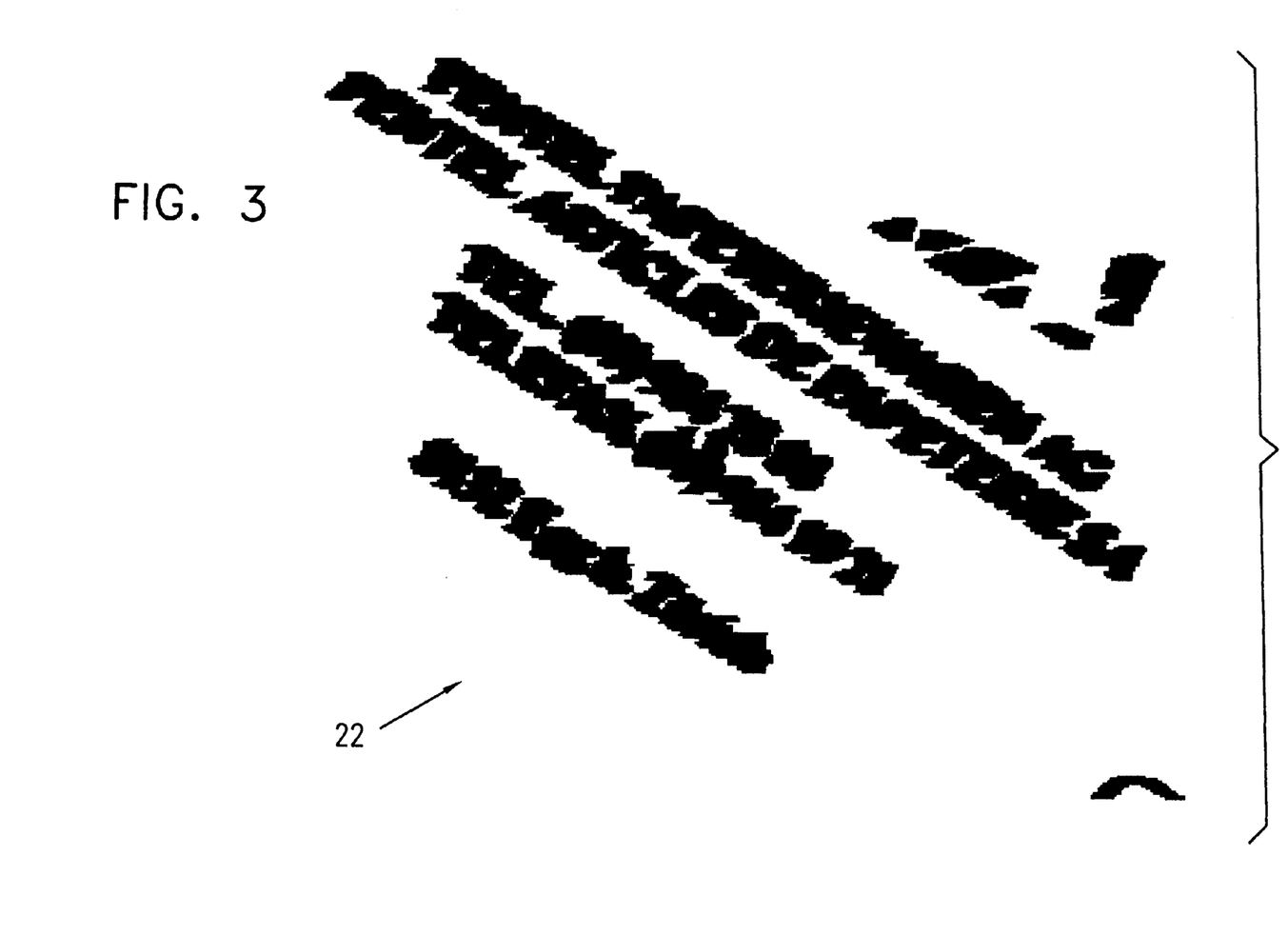
FIGS. 3, 4, and 5 show the scene of FIG. 2 after smearing operations.
Figure 4:
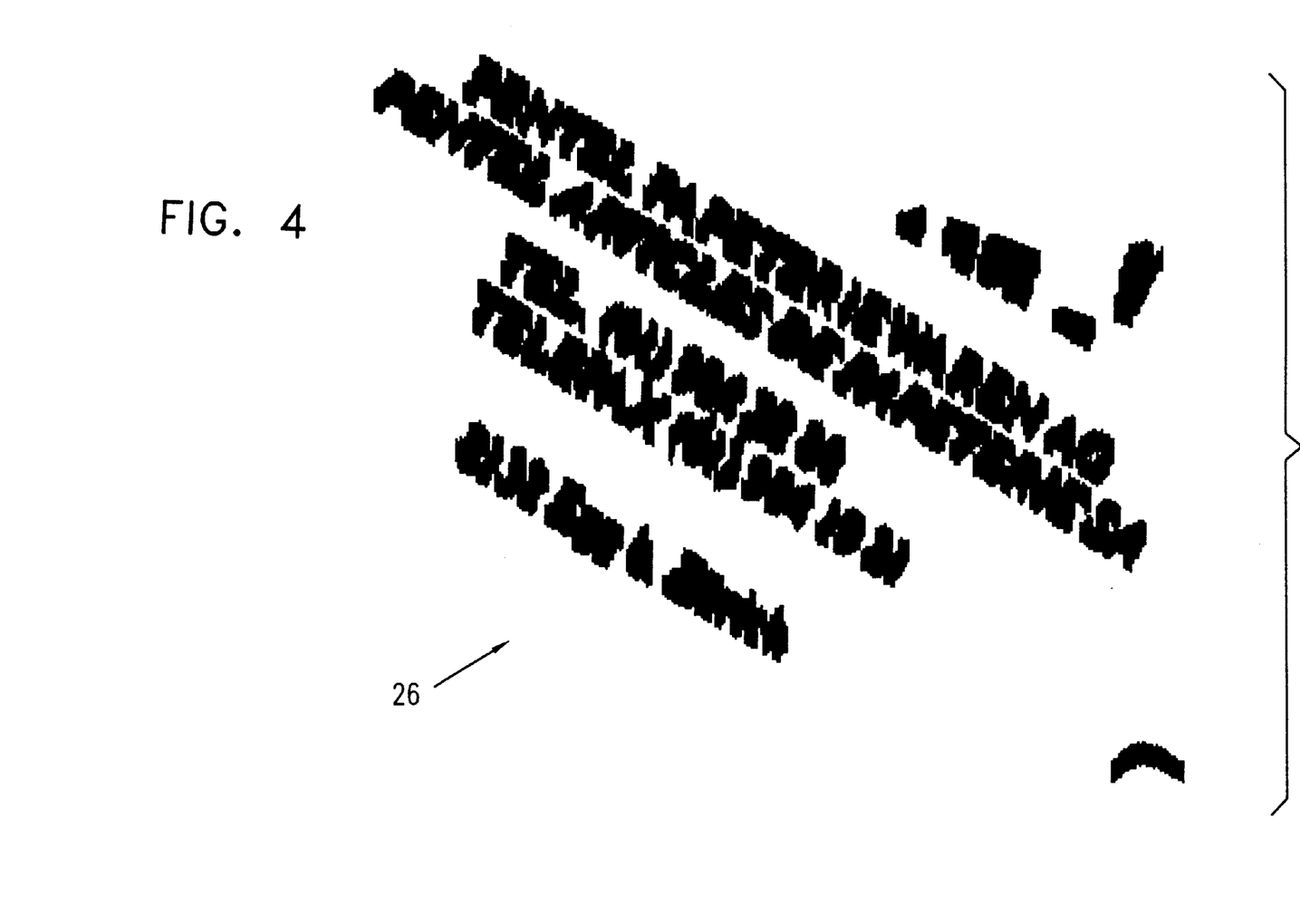
Figure 5:
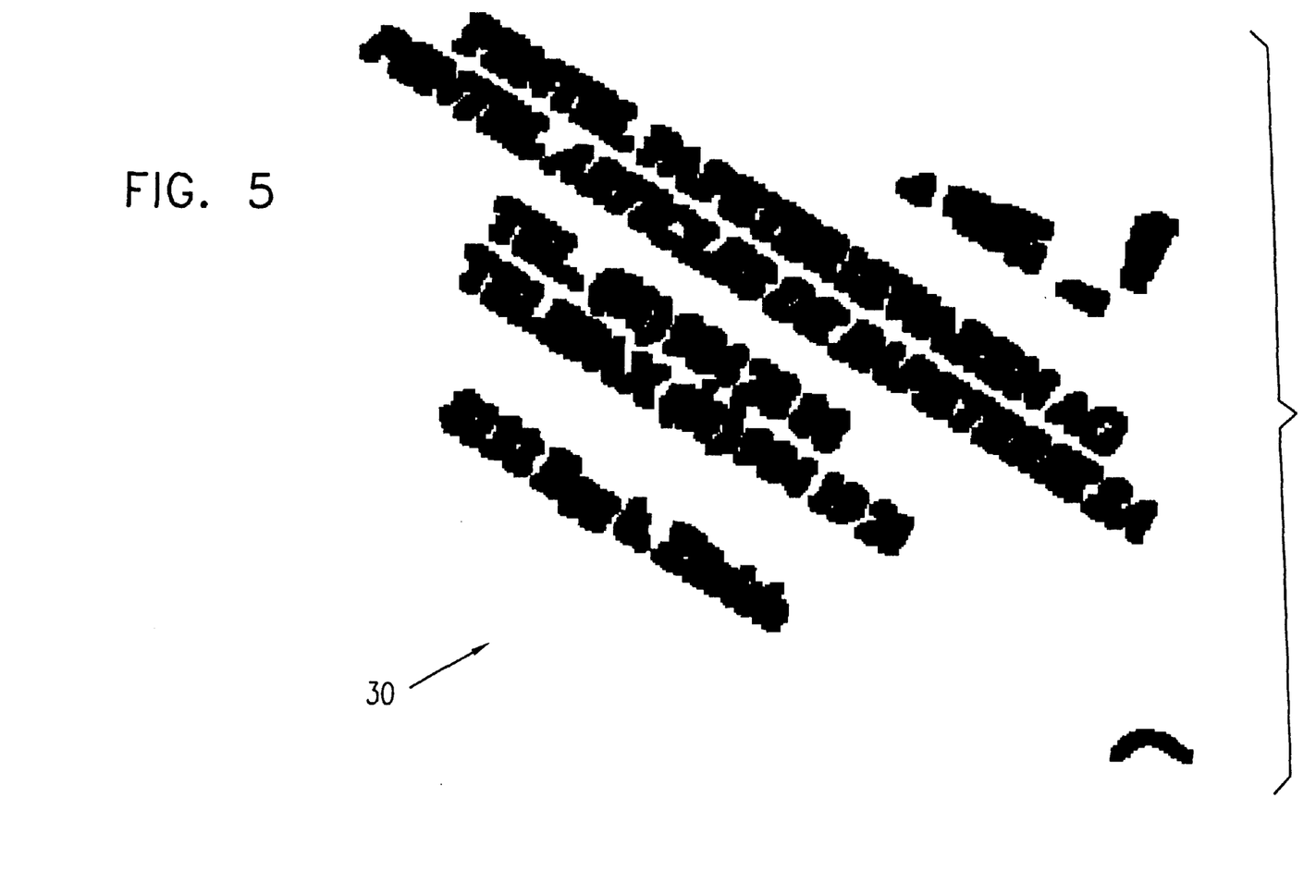

Surprisingly it was discovered that degrading the image facilitates the determination of text lines and improves the estimation of the skew angle. The method according to the invention relies on the evaluation of horizontal or vertical runs (i.e., consecutive dark pixels in a given row or column) to develop text lines. Smearing the text in the image reduces the number of runs in the image and improves computational efficiency. Smearing is accomplished by the morphologic expand operator, in three patterns. At step 20 the image 18 is smeared horizontally to produce a first smeared image 22 (FIG. 3). Then, at step 24 the image 18 is smeared vertically to produce a second smeared image 26 (FIG. 4). At step 28 the image 18 is smeared both horizontally and vertically to produce a third smeared image 30 (FIG. 5).

The number of horizontal runs is computed in each of the images 22, 26 and 30 in step 32. At step 34 the image having the fewest runs, whether in the horizontal or the vertical direction, is selected for further processing. Although a particular order of smearing has been specified herein by way of example, those skilled in the art will appreciate that the images can be smeared in different orders, and in some implementations, computational efficiency could be achieved by executing a second smearing operation on one of the images developed in step 24 or step 28 rather than on the image 18. Similarly, variations in the order of run computation will occur to those skilled in the art, and can be implemented without departing from the spirit of the invention.

Figure 6:
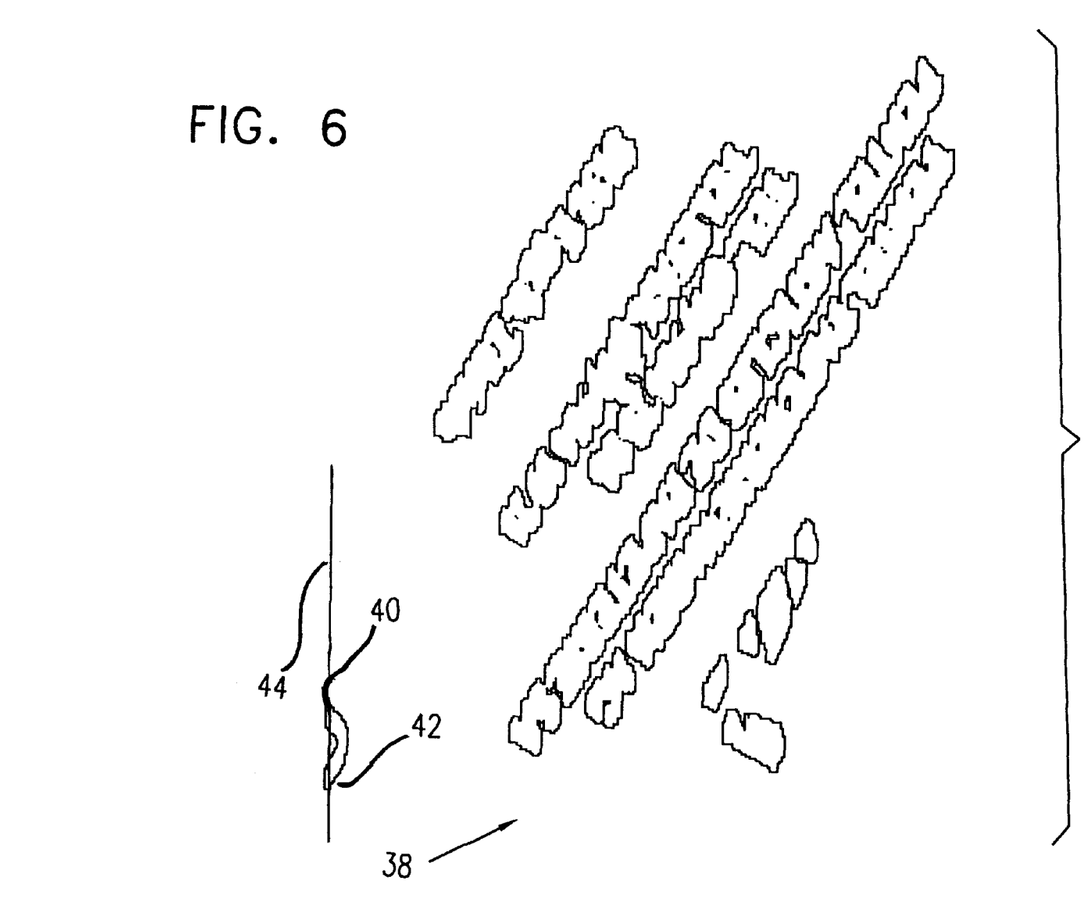
FIG. 6 illustrates an image used for sampling points according to the invention.

Generally only the start and the end points of the runs of the selected image are evaluated in order to find the skew angle of the text. These points are obtained in step 36. In the case of the image 18, the first smeared image 22, which was smeared horizontally, was selected for sampling at step 34, and vertical runs are evaluated. Referring now to FIG. 6, which illustrates the sampled image 38, only those points in a vertical run are sampled, for example start point 40 and end point 42 which lie in a vertical line 44. It will be evident that these start and end points contribute significantly to skew detection. The sampled image 38 is rotated with respect to the image 18 (FIG. 2) in order to emphasize that the sampling is done vertically (top-bottom), since the runs data are stored by rows.

In the present invention, the well-known Hough method is used to estimate the skew angle at step 46. In general the Hough method defines a closed procedure to fit a set of lines to a set of points. In this process the computing time is proportional to the number of points. The Hough method is well known in the art, and in the interest of brevity will not be discussed in detail herein. For the line search in the Hough method, the normal representation of a line is used:

$$\Delta = x \cos \theta + y \sin \theta$$

A set of points lying on a line has the same $\Delta$ and $\theta$. The Hough plane is a quantized ($\Delta$ [i], $\theta$[j]) plane. For each point (x, y) and $\theta$[j], $\Delta$ is calculated and accumulated in the appropriate (i, j) cell in the Hough plane. The dominant cells in the Hough plane are the ($\Delta$ [i], $\theta$[j]) parameters of the dominant lines. Dominance is determined by the number of points which contribute to the line.

Figure 7:
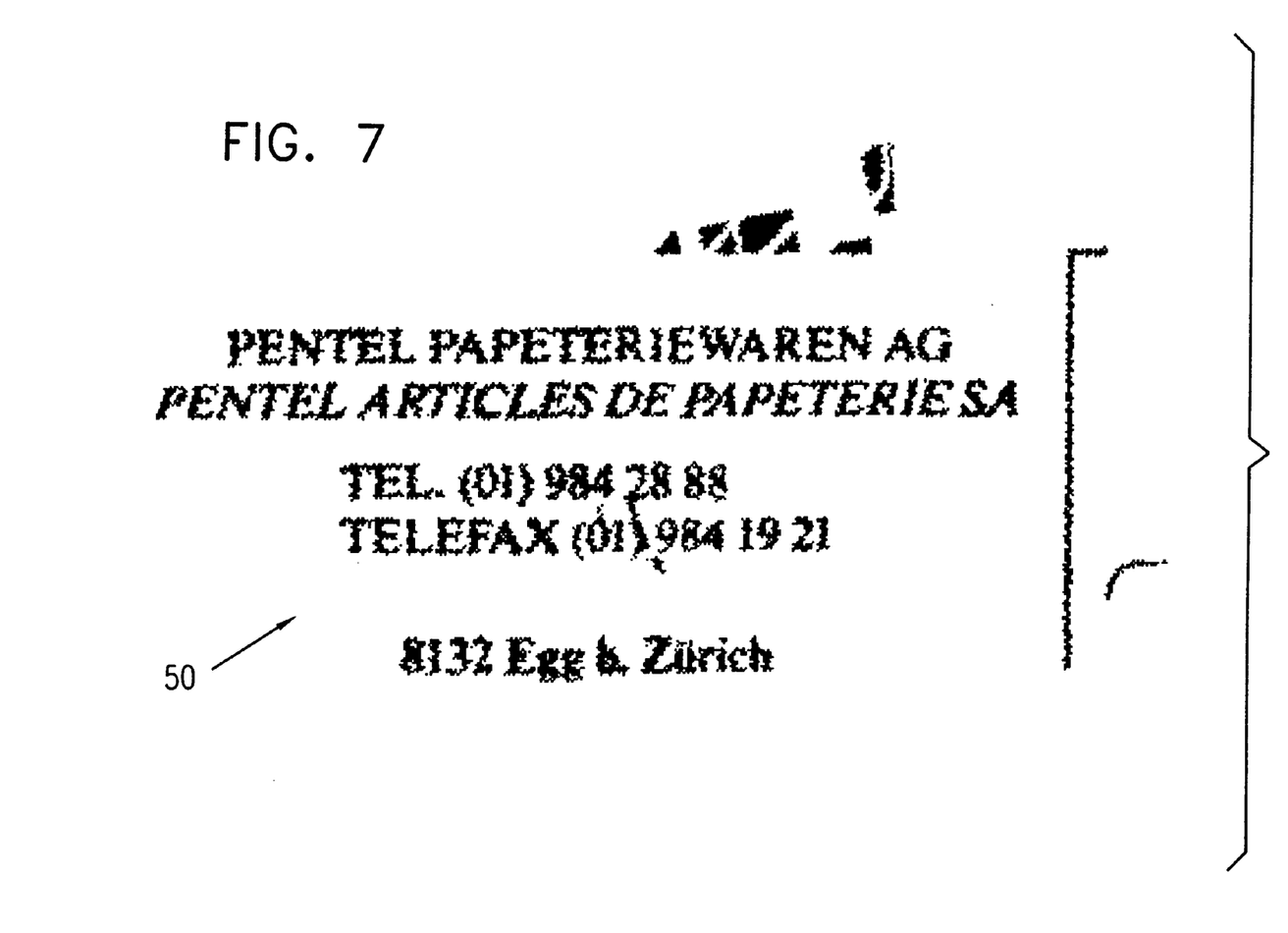
FIG. 7 shows a deskewed image which is the output of the method in accordance with the invention.

The build-up of the Hough plane is proportional to the number of points and to the resolution of $\theta$. To speed up step 46, the build up is carried in a coarse resolution and fine resolution of $\theta$. From the coarse step some candidate values for $\theta$ are found, for example the range of 1 0 180 degrees in steps of 3. Around these values, a fine resolution of $\theta$ is chosen to rebuild the Hough plane. The Hough process returns several dominant lines, which are the text lines, and other artifacts. Each line is defined by the parameters ($\Delta$, $\theta$) and its dominance. Among these lines, voting is carried out in step 48 to define the best angle. The voting procedure is as follows:

The max hp (i,j) is found under the constraints $hp\ (i,j) > hp\ (i+1, j)$ $hp\ (i,j) > hp\ (i-1, j)$ $hp\ (i,j) > hp\ (i, j+1)$ $hp\ (i,j) > hp\ (i, j-1)$, where hp (i,j) is the value of cell (i,j) in the Hough plane. Both global and local maxima are evaluated. The resulting image 50 as shown in FIG. 7 is deskewed in step 52 in accordance with the skew angle of the elected text line.

The skew detection method disclosed herein is preferably practiced with a digital computer, for which a program of computer-readable instructions representing the steps of the method is provided on a computer readable medium (not shown).

Figure 8:
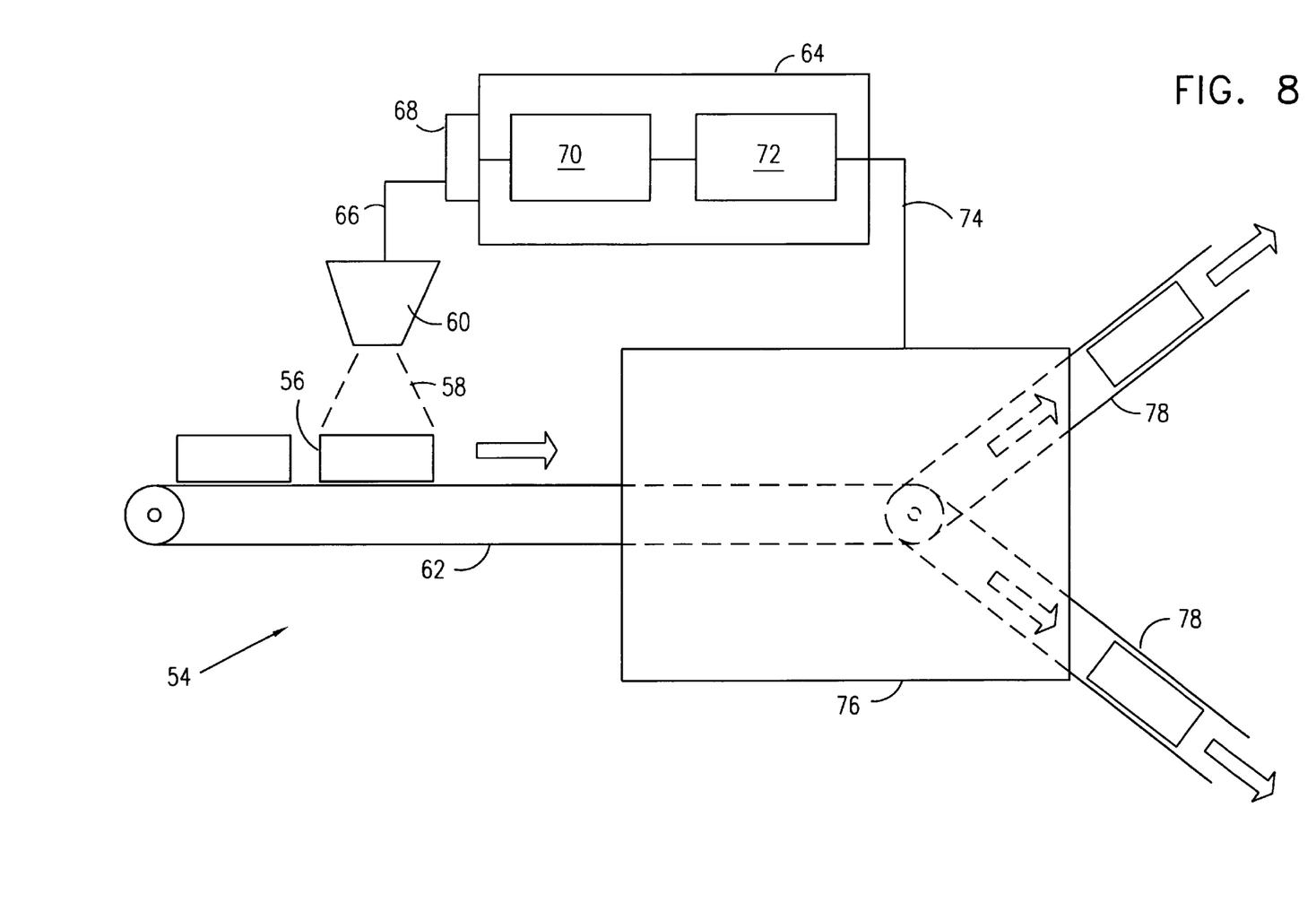
FIG. 8 schematically illustrates a preferred embodiment of the invention wherein a mail sorting system performs the method depicted in FIG. 1.

A preferred embodiment of the invention is shown in FIG. 8, which illustrates a mail sorting system 54. Items to be sorted, for example a parcel 56 on which address information is written, are moved through the field of view 58 of image acquisition device 60 on a conveyor 62. The image acquired by the image acquisition device 60 is presented to a computer 64 via line 66, and converted to a digitized format by well known means in digitizing unit 68. The output of the digitizing unit 68 is a digitized gray scale image, which typically is a complex scene containing noise as well as skewed address information or other classification information. Module 70 of the computer 64 executes a program of instructions representing the steps of the skew detection method disclosed herein. The program is typically provided on a computer-readable medium (not shown). A deskewed image representing the output of the module 70 is presented to an text analysis module 72, which can be an OCR device. In accordance with the analysis by the text analysis module 72 control instructions are transmitted via line 74 to a sorting unit 76, which directs the parcel 56 along one of a plurality of conveyors 78 for further disposition.

Disclosed herein are an improved method and system for skew angle detection in noisy digitized gray scale images, which assumes no constraints on the range of the skew angle. The method is computationally efficient, using a minimal number of sampling points in the Hough procedure, which is carried out on an intentionally degraded image, using coarse and fine search techniques. The technique has the ability to detect more than one skew angle in scenes having text in more than one orientation. While this invention has been explained with reference to the structure disclosed herein, it is not confined to the details set forth and this application is intended to cover any modifications and changes as may come within the scope of the following claims.

What is claimed is:

1. In a text image processing system, a method for text skew detection, comprising the steps of:

smearing a digitized image in one of a horizontal direction and a vertical direction to yield a first smeared image;

smearing the digitized image in another of said horizontal direction and said vertical direction to yield a second smeared image;

smearing the digitized image in both of said horizontal direction and said vertical direction to yield a third smeared image; and selecting one of said first, second and third smeared images according to a minimum number of runs therein; and selecting a dominant line from the selected smeared digitized image, wherein a text skew angle is determined by a direction of the dominant line.

2. The method according to claim 1, further comprising the step of:

prior to said step of selecting a dominant line sampling start points and end points of runs in said smeared image to yield a sampled image, wherein said step of selecting a dominant line is performed on said sampled image.

3. A computer software product, comprising a computer-readable medium in which computer program instructions are stored, which instructions, when read by a computer, cause the computer to accept as input a digitized image having textual material embedded therein, and to determine at least one skew angle of the textual material by the steps of:

smearing the digitized image in one of a horizontal direction and a vertical direction to yield a first smeared image;

smearing the digitized image in another of said horizontal direction and said vertical direction to yield a second smeared image;

smearing the digitized image in both of said horizontal direction and said vertical direction to yield a third smeared image; and selecting one of said first, second and third smeared images according to a minimum number of runs therein; and selecting a dominant line from the selected smeared digitized image, wherein a text skew angle is determined by a direction of the dominant line.

4. The computer software product according to claim 3, wherein said computer program instructions further cause the computer to execute the step of:

prior to selecting a dominant line sampling start points and end points of runs in said smeared image to generate a sampled image, wherein said step of selecting a dominant line is performed on said sampled image.

5. An automated classification system, comprising:

a conveyance for transporting items to be classified, said items having classification information written thereon;

an acquisition device having a field of view directed toward said conveyance for acquiring an image of said classification information;

a digitizing unit for converting said acquired image to a digitized image;

a computer executing a program of instructions which causes the computer to accept as input said digitized image, and to determine at least one skew angle of the classification information by the steps of:

expansively smearing the digitized image in one of a horizontal direction and a vertical direction to yield a first smeared image;

smearing the digitized image in another of said horizontal direction and said vertical direction to yield a second smeared image;

smearing the digitized image in both of said horizontal direction and said vertical direction to yield a third smeared image; and selecting one of said first, second and third smeared images according to a minimum number of runs therein;

selecting a dominant line from the selected smeared digitized image, wherein a text skew angle is determined by a direction of the dominant line;

an analysis program of said computer accepting said digitized image and said skew angle for deskewing said digitized image and evaluating said classification information, wherein control signals are output from said computer responsive to said analysis program; and a classifier for classifying said transported items responsive to said control signals.

6. The system in accordance with claim 5, wherein said instructions further cause the computer to execute the step of:

prior to selecting a dominant line sampling start points and end points of runs in said smeared image to yield a sampled image, and selection of a dominant line is performed on said sampled image.

7. In a text image processing system, a method for text skew detection, comprising the steps of:

constructing exactly two smeared digitized images by performing any two of the steps of:

expansively smearing a digitized image in one of a horizontal direction and a vertical direction to yield a first smeared image;

expansively smearing the digitized image in another of said horizontal direction and said vertical direction to yield a second smeared image; and expansively smearing the digitized image in both of said horizontal direction and said vertical direction to yield a third smeared image;

selecting one of the two smeared digitized images according to a minimum number of runs therein; and selecting a dominant line from the selected smeared digitized image, wherein a text skew angle is determined by a direction of the dominant line.

8. The method according to claim 7, further comprising the step of:

prior to said step of selecting a dominant line sampling start points and end points of runs in said selected smeared digitized image to yield a sampled image, wherein said step of selecting a dominant line is performed on said sampled image.

9. A computer software product, comprising a computer-readable medium in which computer program instructions are stored, which instructions, when read by a computer, cause the computer to accept as input a digitized image having textual material embedded therein, and to determine at least one skew angle of the textual material by the steps of:

constructing exactly two smeared digitized images by performing any two of the steps of:

expansively smearing a digitized image in one of a horizontal direction and a vertical direction to yield a first smeared image;

expansively smearing the digitized image in another of said horizontal direction and said vertical direction to yield a second smeared image; and expansively smearing the digitized image in both of said horizontal direction and said vertical direction to yield a third smeared image;

selecting one of said two smeared digitized images according to a minimum number of runs therein; and selecting a dominant line from the selected smeared digitized image, wherein a text skew angle is determined by a direction of the dominant line.

10. The computer software product according to claim 9, wherein said computer program instructions further cause the computer to execute the step of:

prior to selecting a dominant line sampling start points and end points of runs in said selected smeared digitized image to generate a sampled image, wherein said step of selecting a dominant line is performed on said sampled image.

11. An automated classification system, comprising:

a conveyance for transporting items to be classified, said items having classification information written thereon;

an acquisition device having a field of view directed toward said conveyance for acquiring an image of said classification information;

a digitizing unit for converting said acquired image to a digitized image;

a computer executing a program of instructions which causes the computer to accept as input said digitized image, and to determine at least one skew angle of the classification information by the steps of:

constructing exactly two smeared digitized images by performing any two of the steps of:

expansively smearing a digitized image in one of a horizontal direction and a vertical direction to yield a first smeared image;

expansively smearing the digitized image in another of said horizontal direction and said vertical direction to yield a second smeared image; and expansively smearing the digitized image in both of said horizontal direction and said vertical direction to yield a third smeared image;

selecting one of said two smeared digitized images according to a minimum number of runs therein; and selecting a dominant line from the selected smeared digitized image, wherein a text skew angle is determined by a direction of the dominant line;

an analysis program of said computer accepting said digitized image and said skew angle for deskewing said digitized image and evaluating said classification information, wherein control signals are output from said computer responsive to said analysis program; and a classifier for classifying said transported items responsive to said control signals.

12. The system in accordance with claim 11, wherein said instructions further cause the computer to execute the step of:

prior to selecting a dominant line sampling start points and end points of runs in said selected smeared image to yield a sampled image, and selection of a dominant line is performed on said sampled image.

13. The method according to claim 1, further comprising the step of binarizing the digitized image prior to said step of smearing, to yield a binary image that includes only text and graphics having a stroke width within a predetermined range of values.

14. The method according to claim 1, further comprising the step of removing nontextual components from said digitized image prior to said step of smearing.

15. The method according to claim 1, wherein said step of selecting a dominant line is performed by a Hough method.

16. The method according to claim 15, wherein said Hough method is conducted at a first, coarse angular resolution and then at a second, fine angular resolution.

17. The method according to claim 1, further comprising the step of:

prior to said step of selecting a dominant line sampling start points and end points of runs in said smeared image to yield a sampled image, wherein said step of selecting a dominant line is performed on said sampled image.

18. The computer software product according to claim 3, wherein said computer program instructions further cause the computer to binarize the digitized image prior to said step of smearing to yield a binary image that includes only text and graphics having a stroke width within a predetermined range of values.

19. The computer software product according to claim 3, wherein said computer program instructions further cause the computer to remove nontextual components from said digitized image prior to said step of smearing.

20. The computer software product according to claim 3, wherein said computer program instructions further cause the computer to select said dominant line by executing a Hough method.

21. The computer software product according to claim 20, wherein said computer program instructions further cause the computer to execute said Hough method at a first, coarse angular resolution and then at a second, fine angular resolution.

22. The computer software product according to claim 3, wherein said computer program instructions further cause the computer to execute a step of:

prior to selecting a dominant line sampling start points and end points of runs in said smeared image to yield a sampled image, and selection of a dominant line is performed on said sampled image.

23. The system in accordance with claim 5, wherein said instructions further cause the computer to binarize the digitized image prior to said step of smearing to yield a binary image that includes only text and graphics having a stroke width within a predetermined range of values.

24. The system in accordance with claim 5, wherein said instructions further cause the computer to remove nontextual components from said digitized image prior to said step of smearing.

25. The system in accordance with claim 5, wherein said instructions further cause the computer to select said dominant line by executing a Hough method.

26. The system in accordance with claim 25, said instructions further cause the computer to execute said Hough method at a first, coarse angular resolution and then at a second, fine angular resolution.

27. The system in accordance with claim 5, instructions further cause the computer to execute a step of:

prior to selecting a dominant line sampling start points and end points of runs in said smeared image to yield a sampled image, and selection of a dominant line is performed on said sampled image.

* * * * *

UNITED STATES PATENT AND TRADEMARK OFFICE
Certificate

Patent No. 6,687,421 B1                                                              Patented: February 3, 2004

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Yaakov Navon, Ein Vered, Israel; and Yuval Eldar, Haifa, Israel.

Signed and Sealed this Sixth Day of September 2005.

<div style="text-align:right">

BHAVESH MEHTA
*Supervisory Patent Examiner*
Art Unit 2625

</div>